US006593959B1

(12) United States Patent
Kim et al.

(10) Patent No.: US 6,593,959 B1
(45) Date of Patent: Jul. 15, 2003

(54) STEREOSCOPIC IMAGE DISPLAY APPARATUS USING MICROPOLARIZER

(75) Inventors: Sung-Sik Kim, Seoul (KR); Jun-Ho Sung, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/291,955

(22) Filed: Apr. 15, 1999

(30) Foreign Application Priority Data

Apr. 16, 1998  (KR) ............................................. 98-13553

(51) Int. Cl.[7] ...................... H04N 15/00; H04N 13/04; G09G 5/39; G02B 27/26
(52) U.S. Cl. ........................ 348/57; 345/531; 359/465
(58) Field of Search .......................... 348/46, 47, 49, 348/51, 52, 53, 54, 55, 56, 61, 58, 42; 345/213, 204, 531, 545, 420; 713/501; 359/465

(56) References Cited

U.S. PATENT DOCUMENTS

| 4,122,484 A | | 10/1978 | Tan | |
|---|---|---|---|---|
| 4,562,463 A | * | 12/1985 | Lipton | .......................... 348/56 |
| 5,007,715 A | | 4/1991 | Verhulst | |
| 5,495,576 A | * | 2/1996 | Ritchey | .......................... 345/420 |
| 5,537,144 A | * | 7/1996 | Faris | .......................... 348/58 |
| 5,606,348 A | * | 2/1997 | Chiu | .......................... 345/213 |
| 5,638,082 A | | 6/1997 | Grimm | |
| 5,844,717 A | | 12/1998 | Faris | |

\* cited by examiner

*Primary Examiner*—Gims S. Philippe
(74) *Attorney, Agent, or Firm*—Robert E. Bushnell, Esq.

(57) ABSTRACT

A stereoscopic image display apparatus for displaying a three dimensional image on a screen of a display panel comprises a three dimensional video signal processor for converting an analog three dimensional video signal to a digital three dimensional video signal, and a micropolarizer attached to the display panel. The micropolarizer is composed of a plurality of first polarizing regions having a first polarizing direction and a plurality of second polarizing regions having a second polarizing direction perpendicular to the first polarizing direction. The first and second polarizing regions are alternately arranged with each other in the form of a matrix. The three dimensional video signal processor further includes a video/sync signal separator for separating the analog three dimensional video signal into an analog video signal and a synchronizing signal, a clock signal generator for generating a clock signal with a frequency corresponding to the synchronizing signal, a control signal generator for generating various control signals in response to the clock signal, an A/D converter for converting the analog video signal to a digital video signal, a first memory device for storing the part of the digital video signal belonging to the odd field, a second memory device for storing the part of the digital video signal belong to the even field of the digital video signal, and a multiplexer for multiplexing the left and right eye video signals respectively generated from the first and second field memory devices to generate a three dimensional digital video signal.

15 Claims, 6 Drawing Sheets

STEREOSCOPIC IMAGE DISPLAY APPARATUS USING MICROPOLARIZER

CLAIM OF PRIORITY

This application makes reference to, incorporates the same herein, and claims all benefits accruing under 35 U.S.C §119 from an application entitled Stereoscopic Image Display Apparatus Using Micro Polarizer earlier filed in the Korean Industrial Property Office on Apr. 16, 1998, and there duly assigned Serial No. 98-13553 by that Office.

BACKGROUND OF THE INVENTION

1. Field of the Invention

The present invention concerns a stereoscopic image display apparatus for displaying an image as a three dimensional image (3D image).

2. Background Art

It is known to use 3D video camera to record a 3D image which gives the effect of solidity or depth to an ordinarily plane image. The 3D image is usually produced by employing the visual effect obtained by a stereoscope, through which one may view photographs of objects not merely as plane representations, but with an appearance of solidity, and in relief. The stereoscope is essentially an instrument in which two photographs of the same object, taken from slightly different angles, are simultaneously presented, one to each eye. Each picture is focused by a separate lens, and the two lenses are inclined so as to shift the images toward each other and thus ensure the visual blending of the two images into one three dimensional image. The 3D images taken by the video camera are usually processed for display according to the NTSC (National Television System Committee or PAL (Phase Alteration by Line) standards.

The conventional 3D video signal processor used in the stereoscopic image display apparatus requires a large number of memory devices to perform the field doubling or multiplexing the video data of both lenses, thus increasing its production cost. Particularly, it is very difficult to separate the video data of each pixel of the horizontal line into the left and right eye (lens) data in the lenticular type 3D video signal processor.

Figure 1:
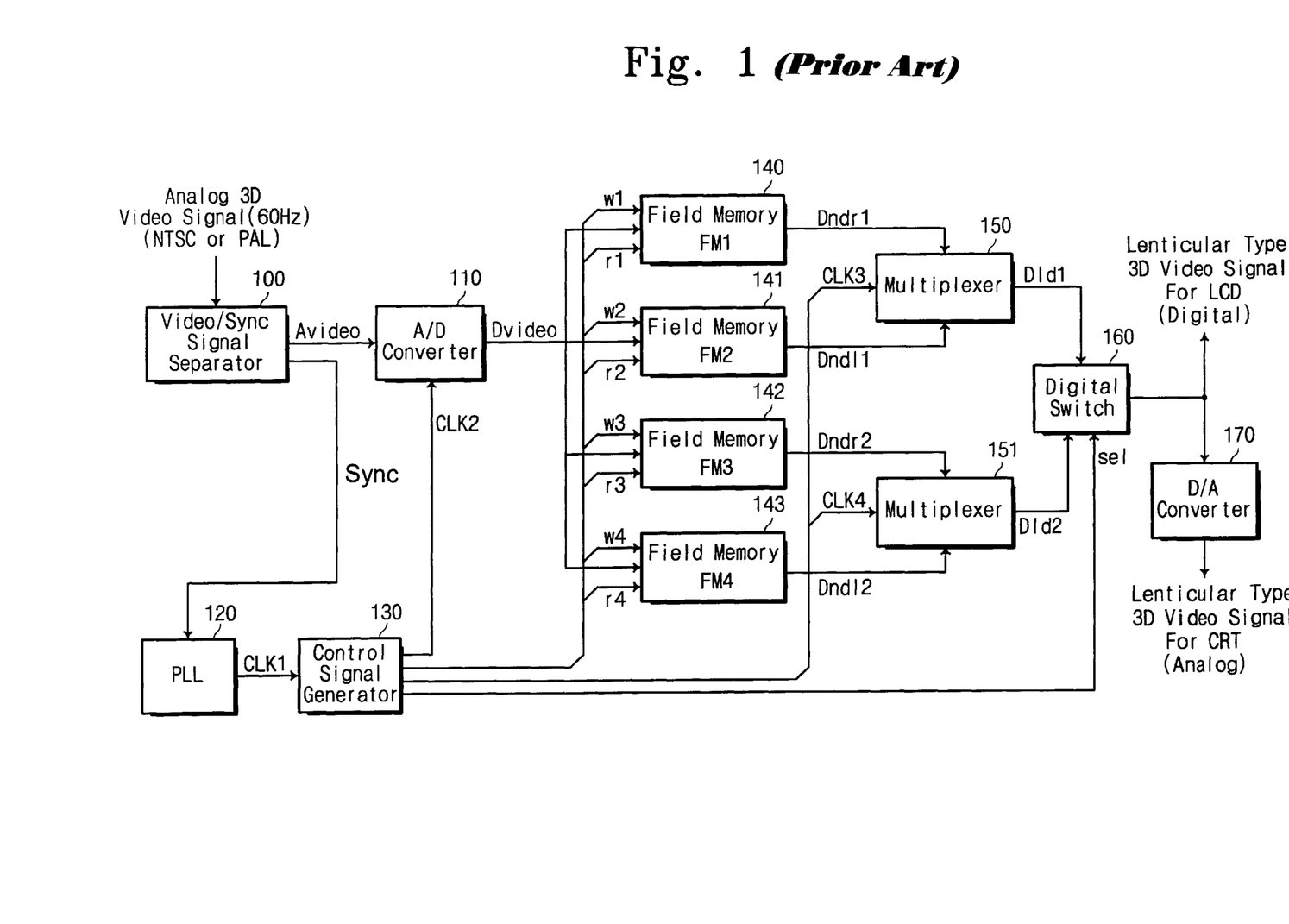
FIG. 1 is a block diagram for illustrating the structure of a conventional 3D video signal processor used in an LCD.
Figure 2:
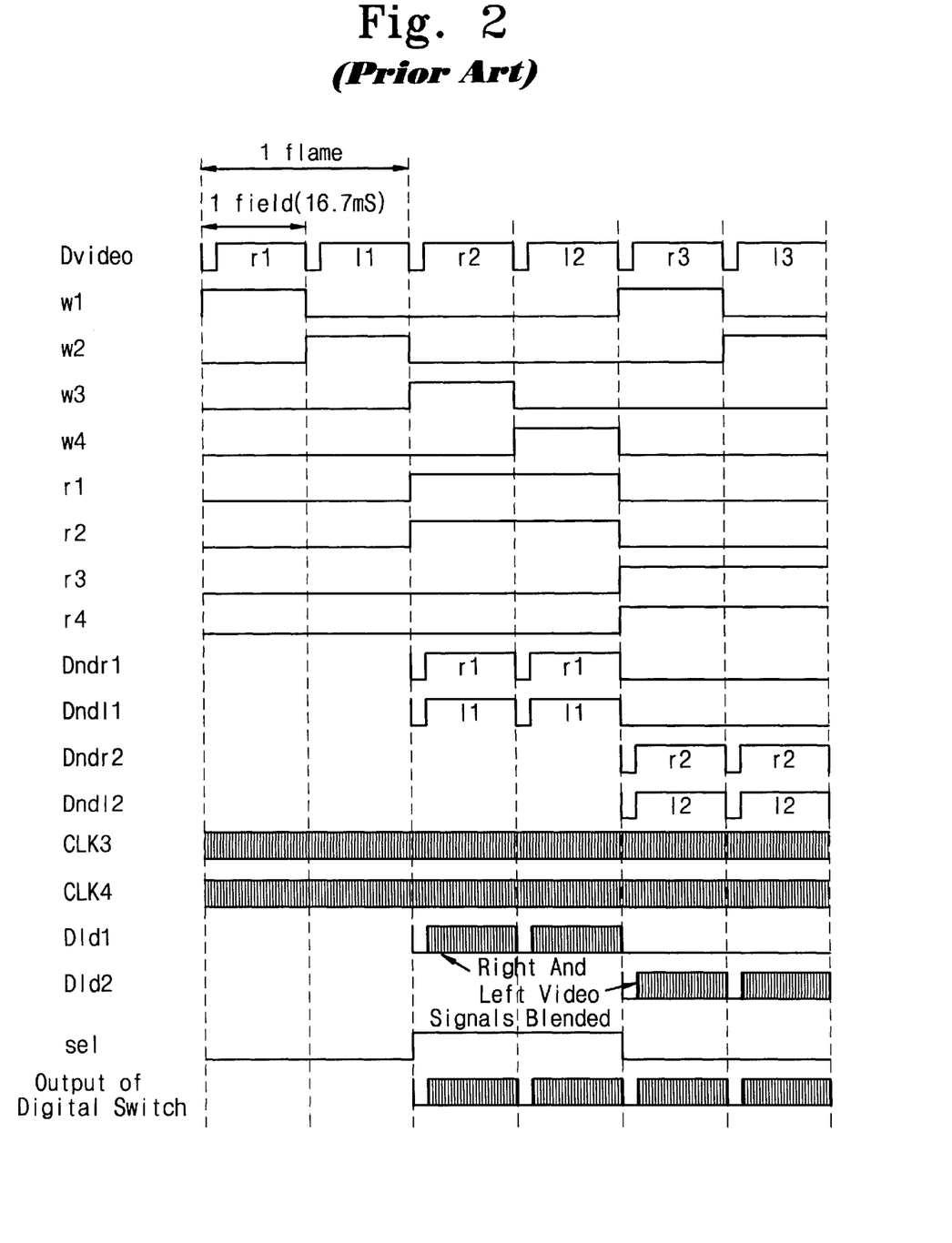
FIG. 2 illustrates the waveforms of the input and output signals of each circuit block shown in FIG. 1.

FIGS. 1 and 2 illustrate the structure of a conventional 3D video signal processor used in an LCD display and the signal waveforms thereof. The conventional 3D video signal processor includes a video/sync signal separator 100 for separating a 3D video signal according to NTSC or PAL into a synchronizing signal Sync and an analog RGB video signal Avideo, an analog-to-digital (A/D) converter 110 for converting the analog video signal Avideo to a digital video signal Dvideo, a phase locked loop circuit PLL 120 for generating a clock signal CLK1 in response to the synchronizing signal Sync, first to fourth field memory devices 140 to 143 for storing the digital video signal Dvideo, first and second multiplexers 150 and 151 for blending the left and right video signals from the first to fourth field memory devices and performing polarity inversion on them to accommodate the characteristics of the LCD, a digital switch 160 for selectively outputting the blended video signal, a control signal generator 130 for generating various control signals, and a digital-to-analog (D/A) converter 170 for converting the digital video signal to an analog video signal. The operation of such conventional 3D video signal processor is as follows:

An analog 3D video signal according to NTSC or PAL is separated by the video/sync signal separator 100 to an analog video signal Avideo and a synchronizing signal Sync. The analog video signal Avideo is converted by the A/D converter 110 to a digital video signal Dvideo and stored into the first to fourth field memory devices 140 to 143. The synchronizing signal Sync is applied to the PLL 120, which generates a clock signal CLK1 of a predetermined frequency which is then supplied to the control signal generator 130. Control signal generator 130 generates the control signals required for each circuit. The control signals include a sampling clock signal CLK2 for the A/D converter 110, write/read (W/R) enable signals w1 to w4 and r1 to r4 for the first to fourth field memory devices 140 to 143, switching clock signals CLK3 and CLK4 for the first and second multiplexers 150 and 151, and a selection signal sel for the digital switch 160. According to the write enable signals of the control signal generator 130, the digital video signal Dvideo is divided into even, odd, left eye and right eye data stored respectively into the first to fourth memory devices 140 to 143. The output signals Dndr1, Dndl1, Dndr2, Dndl2 of the first to fourth field memory devices 140 to 143 are field doubled, whose waveforms are shown in FIG. 2.

The outputs of the first to fourth field memory devices 140 to 143 are properly delivered to the first and second multiplexers 150 and 151, as shown in FIG. 1, to blend them according to the switching clock signals CLK3, CLK4 and make the polarity inversion according to the characteristics of the LCD, thereby generating 3D video signals Dld1 and Dld2 of lenticular type. The digital switch 160 selectively allows the outputs of the multiplexers according to the selection signal sel of the control signal generator 130. If desired for a CRT display, a D/A converter 170 may be provided to obtain an analog 3D video signal of lenticular type.

However, such conventional 3D video signal processor of lenticular type requires the left and right eye data separated of each pixel of the horizontal line, which seriously complicate the circuit construction increasing the number of the memory devices to perform the field doubling and blending of the left and right eye data. This results in increase of the production cost.

Various methods and devices are known for providing three dimensional images as exemplified by the following patents incorporated herein by reference: U.S. Pat. No. 4,122,484 to Sing Liong Tan entitled Display Device For Three-dimensional Television; U.S. Pat. No. 4,562,463 to Lenny Lipton entitled Stereoscopic Television With Field Storage For Sequential Display Of Right And Left Images; U.S. Pat. No. 5,007,715 to Antonius G. H. Verhulst entitled Display And Pick-Up Device For Stereoscopic Picture Display; U.S. Pat. No. 5,537,144 to Sadeg M. Faris entitled Electro-Optical Display System For Visually Displaying Polarized Spatially Multiplexed Images Of 3-D Objects For Use In Stereoscopically Viewing The Same With High Image Quality And Resolution; U.S. Pat. No. 5,638,082 to Wolfgang Grimm entitled Vision Testing For Stereoscopic Viewing By A Test Person; and U.S. Pat. No. 5,844,711 to Sadeg M. Faris entitled Method And System For Producing Micropolariazation Panels For Use In Micropolarizing Spatially Multiplexed Images Of 3-D Objects During Stereoscopic Display Process.

SUMMARY OF THE INVENTION

It is an object of the present invention to provide a stereoscopic image display apparatus which is simplified to reduce the production cost and considerably improve the picture quality by employing a micropolarizer.

According to an embodiment of the present invention, a stereoscopic image display apparatus for displaying a 3D image on a screen of a display panel, comprises a 3D video signal processor for converting an analog 3D video signal to a digital 3D video signal, and a micropolarizer attached to the display panel. The micropolarizer is composed of a plurality of first polarizing regions having a first polarizing direction and a plurality of second polarizing regions having a second polarizing direction perpendicular to the first polarizing direction. The first and second polarizing regions are alternately arranged with each other in the form of a matrix. The 3D video signal processor further includes a video/sync signal separator for separating the analog 3D video signal into an analog video signal and a synchronizing signal, a clock signal generator for generating a clock signal with a frequency corresponding to the synchronizing signal, a control signal generator for generating various control signals in response to the clock signal, an A/D converter for converting the analog video signal to a digital video signal, a first memory device for storing the part of the digital video signal belonging to the odd field, a second memory device for storing the part of the digital video signal belong to the even field of the digital video signal, and a multiplexer for multiplexing the left and right eye video signals respectively generated from the first and second field memory devices to generate a 3D digital video signal. The vertical frequency of the output data of the first and second field memory devices is preferably twice that of the input data. Thus, the analog 3D video signal from a host is separated into an analog video signal and a synchronizing signal. The analog video signal is converted to a digital video signal, which is separated into even and odd line signals stored into the respective field memory devices. The video data stored in the field memory devices are separated into the left and right eye video data, which are delivered to the multiplexers to generate the digital 3D video data. The digital 3D video image is supplied to a LCD display panel which has a micropolarizer attached to the front of the display panel, wherein the micropolarizer is composed of a plurality of first polarizing regions having a first polarizing direction and a plurality of second polarizing regions having a second polarizing direction perpendicular to the first polarizing direction, the first and second polarizing regions being alternately arranged with each other in the form of a matrix. And a viewer utilizes a pair of polarizing eye glasses accommodated to the LCD display panel to see the screen displaying the 3D image. The eye glasses demultiplex the 3D image into the right and left images through right and left polarizing glasses, so that the user again multiplexes the right and left images to finally experience the 3D image.

The present invention will now described more specifically with reference to the drawings attached only by way of examples.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 3:
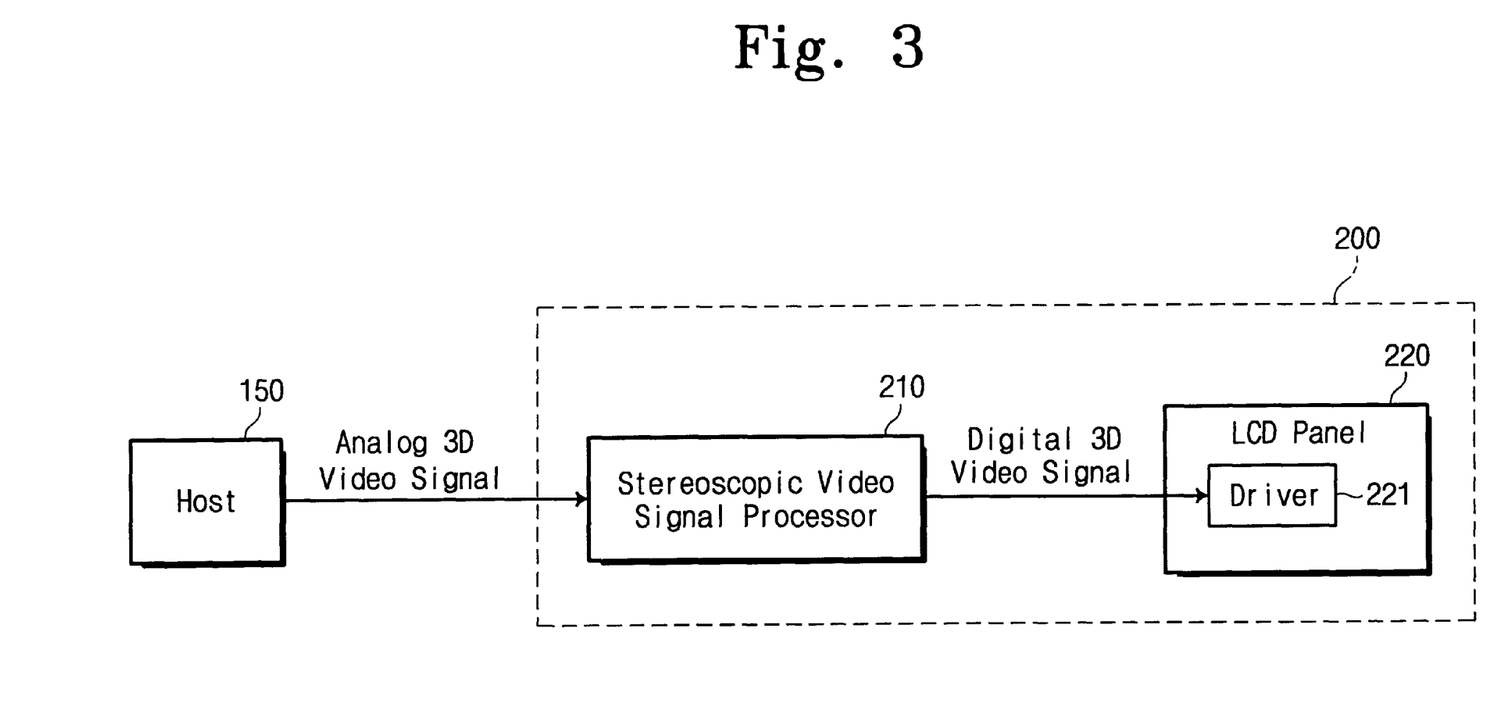
FIG. 3 is a block diagram for illustrating an LCD display apparatus to display a stereoscopic image according to the present invention.

Referring to FIG. 3, the inventive LCD display apparatus 200 includes a 3D video signal processor 210, which processes an analog 3D video signal according to NTSC or PAL from a host 150 to generate a digital 3D video signal delivered through an LCD driver 220 to an LCD panel 220 having a micropolarizer. The user sees the LCD panel through eye glasses coated with a micropolarizer, feeling the 3D image.

Figure 4:
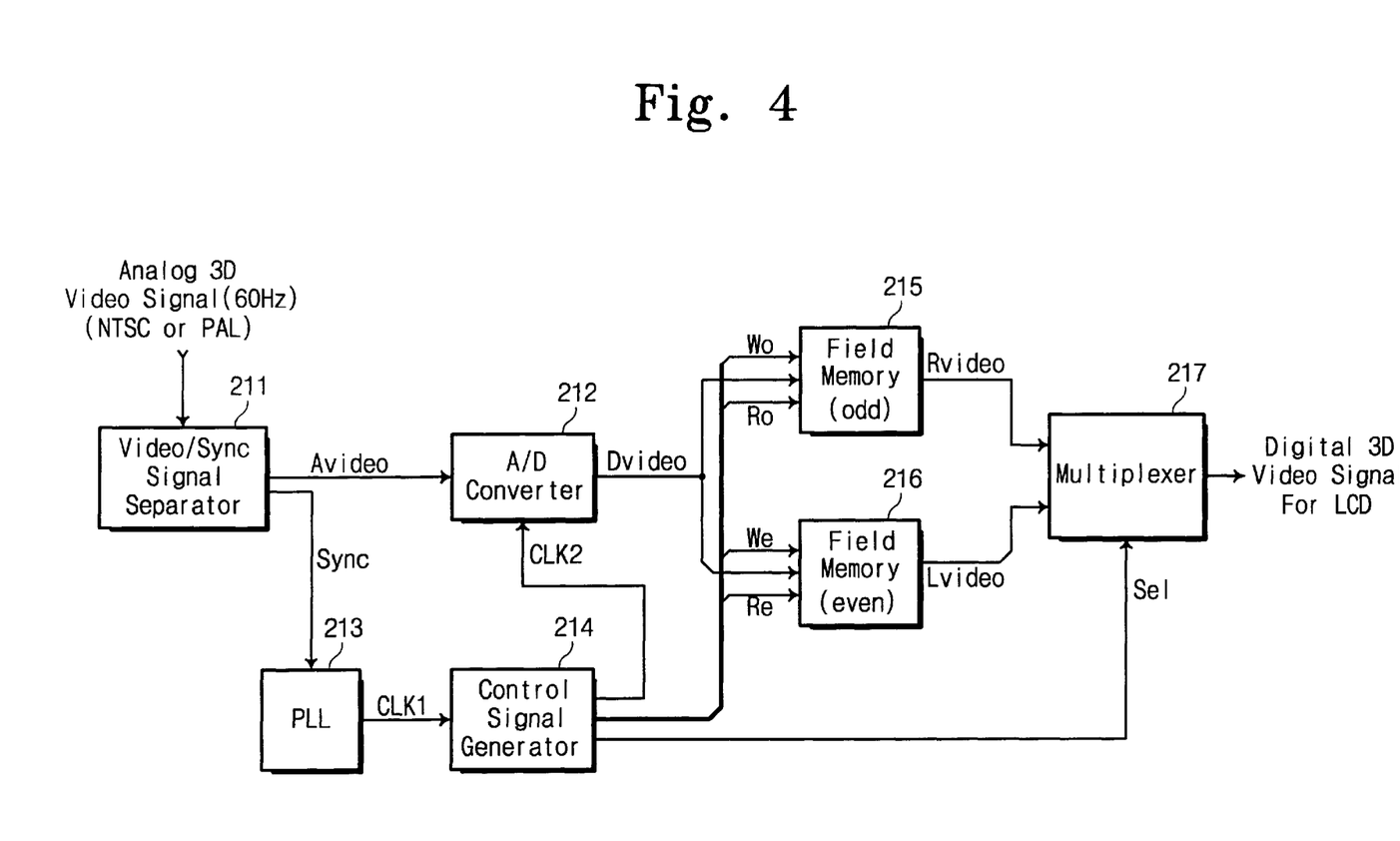
FIG. 4 is block diagram for illustrating the inventive 3D video signal processor as shown in FIG. 3.

The 3D video signal processor 210 comprises, as shown in FIG. 4, a video/sync signal separator 211, an A/D converter 212, a PLL 213, a control signal generator 214, first and second field memory devices 215 and 216, and a multiplexer 217. The video/sync signal separator 211 separates an analog 3D video signal from a host 150 into an analog video signal Avideo and a synchronizing signal Sync. The analog video signal Avideo is converted to a digital video signal Dvideo, which in turn is separated into odd and even fields stored respectively into the first and second field memory devices 215,216. The video data stored in the first and second memory devices 215 and 216 are multiplexed by the multiplexer 217 to generate the digital 3D video signal.

More specifically describing, the video/sync separator 211 separates the analog 3D video signal according to NTSC or PAL into the R, G and B analog video signal Avideo and the synchronizing signal Sync. The analog video signal Avideo is transferred to the A/D converter 212, and the synchronizing signal to the PLL 213. The PLL 213 generates a clock signal CLK1 with a frequency corresponding to the synchronizing signal Sync to supply it to the control signal generator 214, which generates various control signals in synchronism with the clock signal CLK1.

Hence, the A/D converter 212 samples the analog video signal Avideo to generate the digital video signal Dvideo in synchronism with a sampling clock signal CLK2 received from the control signal generator 214. The first and second field memory devices 215 and 216 store the respective data of the digital video signal Dvideo according to the write enable signals Wo, We received from the control signal generator 214. Namely, the first field memory device 215 stores the odd numbered video data representing the right eye image while the second field memory device 216 stores the even numbered video data representing the left eye image.

Meanwhile, the field memory devices 215 and 216 transfer the stored digital video data to the multiplexer 217 in response to the read enable signals Ro, Re. Namely, the first field memory device 215 outputs the right eye video data Rvideo, and the second field memory device 216 outputs the left eye video data Lvideo, to the multiplexer 217. The vertical frequency of the output data of the first and second field memory devices 215 and 216 is twice that of the input data. The write/read enable signals Wo, We, Ro, Re are adjusted to have the frequency of 10 to 50 Mhz, and assuming the vertical frequency of the input data be 30 Mhz, that of the output data becomes 60 Mhz. The multiplexer 217 blends the right and left eye video data Rvideo and Lvideo to generate the digital 3D video data according to the selection signal Sel received from the control signal generator 214.

Figures 5, 5A:
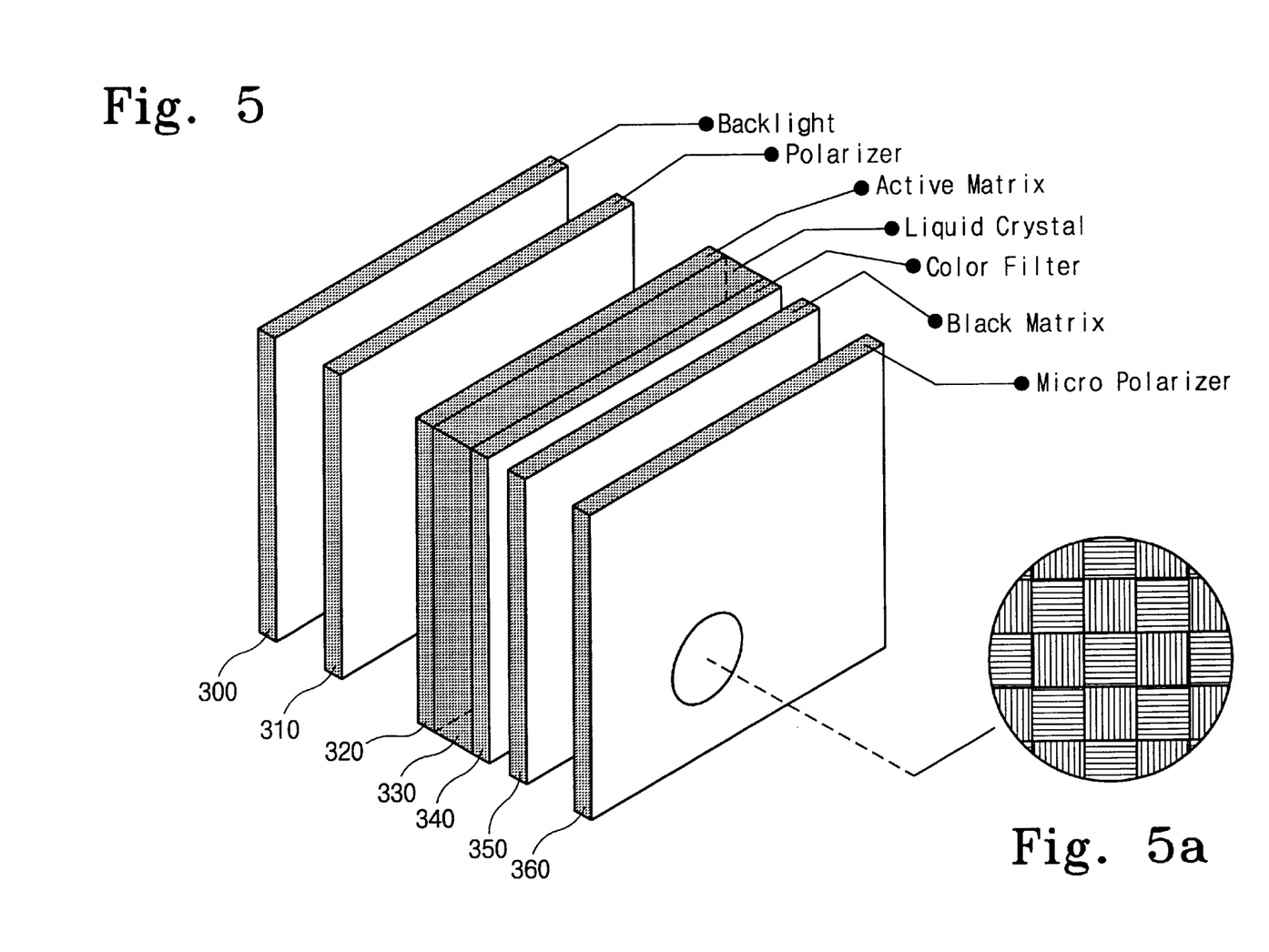
FIG. 5 schematically shows the LCD panel structure of the inventive LCD display apparatus.
FIG. 5a is an enlarged view of a portion of FIG. 5.

Referring to FIG. 5, the LCD panel includes a backlight 300, a polarizer 310, an active matrix 320, a liquid crystal layer 330, a color filter 340, a black matrix 350, and a micropolarizer 360. The micropolarizer 360 forms the upper most surface of the LCD panel, and, as shown in FIG. 5a, is composed of a plurality of polarizing regions corresponding to the pixels of the screen of the LCD panel. The adjacent polarizing regions have different polarizing directions perpendicular to each other so as to separate the displayed 3D image into the left and right eye images.

Figure 6:
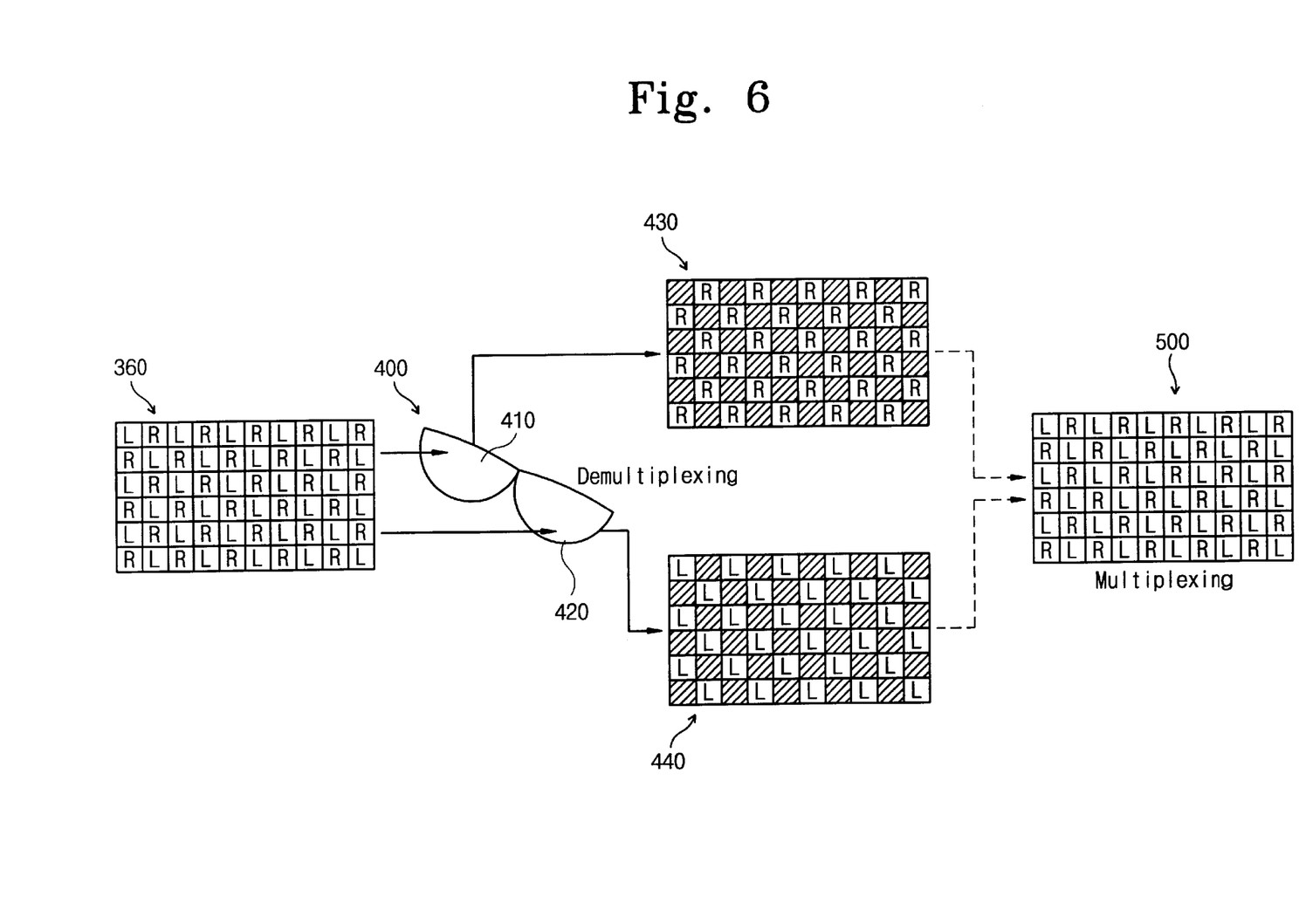
FIG. 6 is a schematic diagram for illustrating the procedure of the user to perceive a stereoscopic image processed by the inventive apparatus.

Describing the procedure of perceiving the 3D image in reference to FIG. 6, the user puts on polarizing eye glasses 400 accommodated to the LCD display panel to see the screen 360 displaying the 3D image. The eye glasses demultiplex the 3D image into the right and left images 430 and 440 respectively through the right and left polarizing lenses 410 and 420, so that the user again multiplexes the right and left images to finally experience the 3D image.

Thus, the present invention considerably simplifies the 3D video signal processor, and reduces the number of the required memory devices, thereby decreasing the production cost. Moreover, the micropolarizer serves to improve the picture quality.

What is claimed is:

1. A stereoscopic image display apparatus for displaying a three dimensional image on a screen of a display panel, comprising:
    a three dimensional video signal processor for converting an analog three dimensional video signal to a digital three dimensional video signal, said three dimensional video signal processor comprising:
        an analog-to-digital converter for converting said analog video signal to said digital video signal;
        a first memory device for storing an odd field of said digital video signal, said odd field corresponding to a right image;
        a second memory device for storing an even field of said digital video signal, said even field corresponding to a left image; and
        a multiplexer for multiplexing the odd and even fields respectively output from said first and second field memory devices to generate said digital three dimensional video signal;
    a micropolarizer attached to said display panel, said micropolarizer being composed of a plurality of first polarizing regions having a first polarizing direction and a plurality of second polarizing regions having a second polarizing direction perpendicular to said first polarizing direction, said first and second polarizing regions being alternately arranged with each other in the form of a matrix to display the left and right images of said digital three dimensional video signal; and
    polarizing eye glasses having left and right polarizing lenses for separating the left and right images, displayed in the form of a matrix via said micropolarizer, to provide the left image to the left eye of a user and to provide the right image to the right eye of the user.

2. The stereoscopic image display apparatus as set forth in claim 1, wherein said three dimensional video signal processor further comprises:
    a video/sync signal separator for separating said analog three dimensional video signal into an analog video signal and a synchronizing signal;
    a clock signal generator for generating a clock signal with a frequency corresponding to said synchronizing signal; and
    a control signal generator for generating various control signals in response to said clock signal.

3. The stereoscopic image display apparatus as set forth in claim 1, wherein a vertical frequency of the output data of the first and second field memory devices is twice that of the input data.

4. The stereoscopic image display apparatus as set forth in claim 1, wherein each of said plurality of first and second polarizing regions of said micropolarizer corresponds to a respective pixel of said screen of said display panel.

5. The stereoscopic image display apparatus as set forth in claim 1, wherein said display panel is a liquid crystal display.

6. The stereoscopic image display apparatus as set forth in claim 5, wherein each of said plurality of first and second polarizing regions of said micropolarizer corresponds to a respective pixel of said liquid crystal display.

7. A method of displaying a three dimensional image via a screen of a display panel, said method comprising steps of:
    receiving an analog three dimensional video signal having a first vertical frequency;
    converting said analog three dimensional video signal to a digital three dimensional video signal having a second vertical frequency greater than said first vertical frequency;
    supplying said three dimensional video signal to said display panel for sequential display as a right video image followed by a left video image;
    providing said left and right images to a viewer via a micropolarizer composed of a plurality of first polarizing regions having a first polarizing direction and a plurality of second polarizing regions having a second polarizing direction perpendicular to said first polarizing direction, said first and second polarizing regions being alternately arranged with each other in the form of a matrix; and
    further providing said left and right images provided via said micropolarizer to said viewer via a pair of glasses composed of a left lens having a first polarization and a right lens having a second polarization perpendicular to said polarization of said left lens.

8. The method as set forth in claim 7, said step of converting comprising steps of:
    separating said analog three dimensional video signal into an analog video signal and a synchronizing signal;
    generating a clock signal with a frequency corresponding to said synchronizing signal;
    generating various control signals in response to said clock signal;
    converting said analog video signal to a digital video signal;
    storing an odd field of said digital video signal in a first field memory, said odd field corresponding to said right video image;
    storing an even field of said digital video signal in a second field memory, said even field corresponding to said left video image;
    outputting the odd and even fields from said first and second field memories at a rate twice that used to store said odd and even fields; and multiplexing the odd and even fields respectively output from said first and second field memories to generate said digital three dimensional video signal.

9. A stereoscopic image display apparatus for displaying a three dimensional image on a screen of a display panel, comprising:

an analog-to-digital converter for converting an analog three dimensional video signal to a digital three dimensional video signal;

a first memory device for storing an odd field of said digital three dimensional video signal, said odd field corresponding to a right image, and outputting said odd field at a vertical frequency greater than a vertical frequency of said analog three dimensional video signal;

a second memory device for storing an even field of said digital three dimensional video signal, said even field corresponding to a left image, and outputting said even field at a vertical frequency greater than the vertical frequency of said analog three dimensional video signal; and a multiplexer for multiplexing the odd and even fields respectively output from said first and second field memory devices and outputting a blended digital three dimensional video signal for display on said display panel;

a micropolarizer attached to said display panel, said micropolarizer being composed of a plurality of first polarizing regions having a first polarizing direction and a plurality of second polarizing regions having a second polarizing direction perpendicular to said first polarizing direction, said first and second polarizing regions being alternately arranged with each other in the form of a matrix to display the left and right images of said digital three dimensional video signal; and polarizing eye glasses having left and right polarizing lenses for separating the left and right images, displayed in the form of a matrix via said micropolarizer, to provide the left image to the left eye of a user and to provide the right image to the right eye of the user.

10. The stereoscopic image display apparatus as set forth in claim 9, further comprising:

a video/sync signal separator for separating said analog three dimensional video signal into an analog video signal and a synchronizing signal;

a phase locked loop for generating a clock signal with a frequency corresponding to said synchronizing signal; and a control signal generator for receiving said clock signal and generating a second clock signal and read and write control signals, said analog-to-digital converter sampling said analog video signal in response to said second clock and said first and second field memory devices being responsive to said read and write control signals.

11. The stereoscopic image display apparatus as set forth in claim 9, wherein a vertical frequency of the even and odd fields output from said first and second field memory devices is twice vertical frequency of the even and odd fields input to said first and second field memory devices.

12. The stereoscopic image display apparatus as set forth in claim 10, wherein a vertical frequency of the even and odd fields output from said first and second field memory devices is twice vertical frequency of the even and odd fields input to said first and second field memory devices.

13. The stereoscopic image display apparatus as set forth in claim 9, wherein each of said plurality of first and second polarizing regions of said micropolarizer corresponds to a respective pixel of said screen of said display panel.

14. The stereoscopic image display apparatus as set forth in claim 9, wherein said display panel is a liquid crystal display.

15. The stereoscopic image display apparatus as set forth in claim 14, wherein each of said plurality of first and second polarizing regions of said micropolarizer corresponds to a respective pixel of said liquid crystal display.

* * * * *